United States Patent
Lu et al.

(10) Patent No.: US 7,450,208 B2
(45) Date of Patent: Nov. 11, 2008

(54) VERTICAL ALIGNMENT LIQUID CRYSTAL DISPLAYS

(75) Inventors: Ruibo Lu, Orlando, FL (US); Qi Hong, Orlando, FL (US); Shin-Tson Wu, Oviedo, FL (US)

(73) Assignee: TPO Displays Corp., Chu-Nan (TW)

( * ) Notice: Subject to any disclaimer, the term of this patent is extended or adjusted under 35 U.S.C. 154(b) by 447 days.

(21) Appl. No.: 11/365,187

(22) Filed: Mar. 1, 2006

(65) Prior Publication Data
US 2007/0206141 A1    Sep. 6, 2007

(51) Int. Cl.
*G02F 1/1337* (2006.01)
(52) U.S. Cl. .................................... 349/129
(58) Field of Classification Search ................ 349/128, 349/129
See application file for complete search history.

(56) References Cited

U.S. PATENT DOCUMENTS

| | | | |
|---|---|---|---|
| 6,285,431 B2 | 9/2001 | Lyu et al. | 349/143 |
| 6,424,398 B1 | 7/2002 | Taniguchi | 349/143 |
| 6,493,050 B1 | 12/2002 | Lien et al. | 349/106 |
| 6,512,568 B2 | 1/2003 | Song et al. | 349/143 |
| 6,570,638 B2 | 5/2003 | Song | 349/143 |
| 6,577,366 B1 | 6/2003 | Kim et al. | 349/139 |
| 6,900,870 B2 * | 5/2005 | Song | 349/130 |
| 6,992,742 B2 * | 1/2006 | Kim et al. | 349/129 |

OTHER PUBLICATIONS

Takeda, et al., "A Super-High Image Quality Multi-Domain Vertical Alignment LCD by New Rubbing-Less Technology," Fujitsu Limited, 4 pages.
Koike, et al., "Super High Quality MVA-TFT Liquid Crystal Displays," Fujitsu Sci. Tech. J.35, 2 pp. 221-228.
Iwamoto, et al., "Transmittance Enhancement for Randomly Aligned Liquid Crystal Displays with Circular Polarizers," Jpn. J. Appl. Phys., vol. 41 (2002) pp. L1382-L1385.
Iwamoto, et al., "Improvement of Display Performance of High Transmittance Photo-Aligned Multi-domain Vertical Alignment LCDs Using Circular Polarizers," pp. 85-88.

* cited by examiner

*Primary Examiner*—Richard H Kim
(74) *Attorney, Agent, or Firm*—Thomas, Kayden, Horstemeyer & Risley

(57) ABSTRACT

A representative device comprises a plurality of pixel units configured for use in a vertical alignment liquid crystal display, wherein a first of the pixel units comprises a first substrate, a second substrate and liquid crystal material. The first substrate comprises a pixel layer thereon, wherein the pixel layer comprises a thin film transistor and a pixel electrode, and the pixel electrode in the first of the pixel units has first openings therein. The second substrate comprises a common electrode thereon, wherein the common electrode has second openings therein, and the second openings and the first openings are arranged in an overlying and cross-over relationship with respect to each other. The liquid crystal layer is between the first and second substrates.

20 Claims, 17 Drawing Sheets

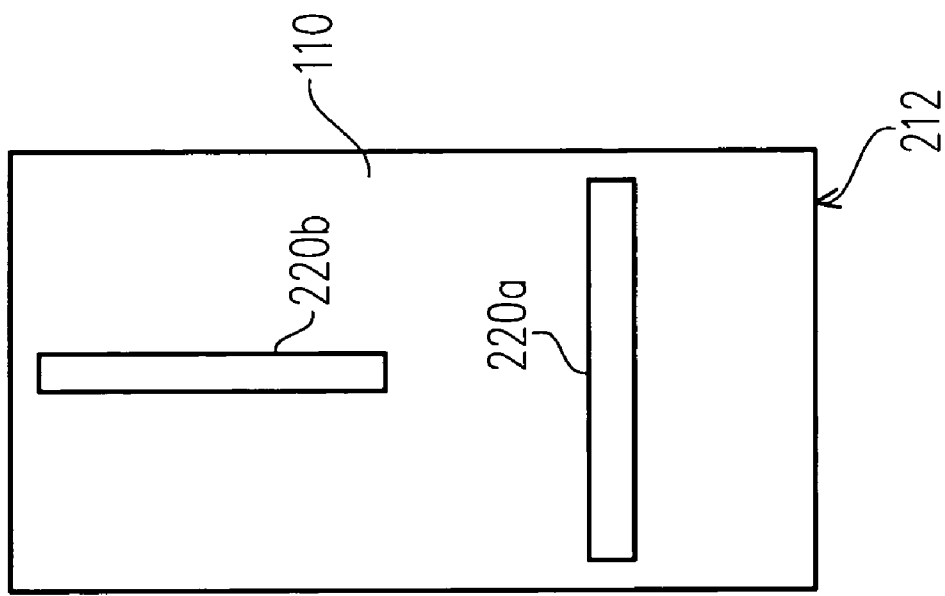
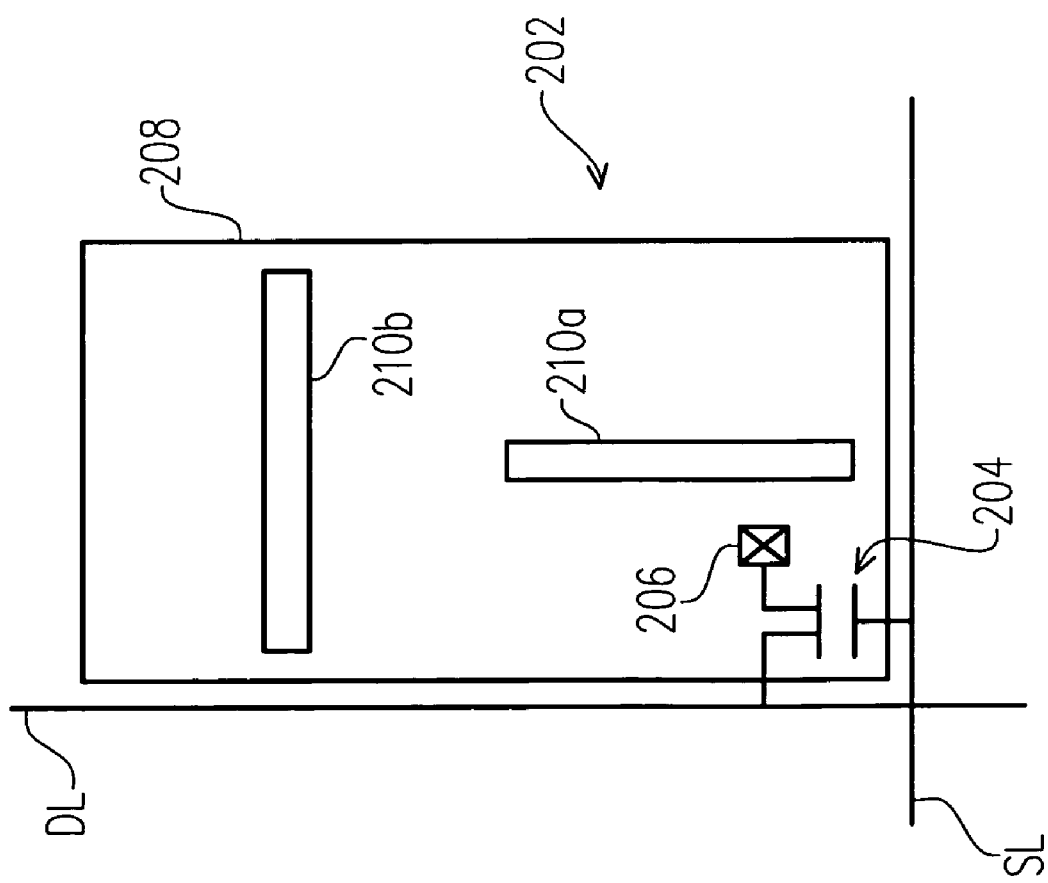

VERTICAL ALIGNMENT LIQUID CRYSTAL DISPLAYS

BACKGROUND OF THE INVENTION

1. Field of the Invention

The present invention generally relates to liquid crystal display (LCD) devices.

2. Description of Related Art

Recently, liquid crystal display (LCD) devices are being used as large size computer monitors and as televisions. To realize a high quality LCD device, high transmittance, high contrast ratio and wide view angle are the main technical parameters that typically are the most highly desired. Vertical alignment (VA) mode LCD devices in normally black mode can provide a sufficiently dark off-state, so it is relatively easy to fabricate an LCD device with high a contrast ratio. To provide a wide view angle range in VA mode, a domain dividing structure typically is used. Therefore, in order to obtain a wide view angle ability in VA mode, control of LC domains (the formation of multi-domain vertical alignment (MVA)) is considered important, especially when the voltage is applied.

Fujitsu Ltd. disclosed an MVA LCD using physical protrusions that was discussed in SID Technical Digest, vol. 29, p. 1077 (1998), Fujitsu Science Technical Journal, vol. 35, p. 221 (1999), and which is also generally disclosed in U.S. Pat. No. 6,424,398 B1. The chevron-patterned protrusions of these disclosures are created on the top and bottom substrates to form four-domain LCD cells in multiple independent directions. The devices provide a high contrast ratio (higher than 300:1), and a view angle wider than 160 degrees using biaxial compensation films. Since the horizontal gap between the upper and the lower protrusions must be less than 30 μm in order to obtain good performance, pixel alignment needs high precision. Thus, the design specification and preparation processes are quite complex and the aperture ratio is limited.

International Business Machines (IBM) Corp. proposed a ridge and fringe-field multi-domain homeotropic (RFF-MH) mode, in which one substrate includes protrusions and the other includes slits to form the multi-domains. Such was published in Material Research Society Symposium Proceedings, vol. 559, p. 275 (1999), and was generally disclosed in U.S. Pat. No. 6,493,050 B1. The device has a contrast ratio larger than 250:1, requires higher driving voltages and requires a long response time.

As a simplified technology of the above MVA and RFF-MH technologies, Samsung Electronics Co. proposed a patterned vertical alignment (PVA) mode, in which only slits were used to produce a multi-domain structure under electric fields. As described in their U.S. Pat. No. 6,285,431 B2 and U.S. Pat. No. 6,570,638 B2, horizontal, vertical or oblique shaped slits are fabricated to form zig-zag or W-shaped ITO patterning structure. Tetragonal rings also are discussed in U.S. Pat. Nos. 6,512,568 and 6,577,366.

In the above-mentioned modes, two linear polarizers are usually used. Additionally, Iwamoto et al have reported an MVA mode using circular polarizers as published in the 9$^{th}$ International Display Workshops, p. 85 (Hiroshima, Japan, Dec. 4-6, 2002) and Japanese Journal of Applied Physics, Vol. 41, p. L1383 (2002).

SUMMARY OF THE INVENTION

Vertical alignment liquid crystal display (LCD) devices are provided. In this regard, an embodiment of a device comprises a plurality of pixel units configured for use in a vertical alignment liquid crystal display, wherein a first of the pixel units comprises a first substrate, a second substrate and a liquid crystal layer. The first substrate comprises a pixel layer thereon, wherein the pixel layer comprises a thin film transistor and a pixel electrode, and the pixel electrode in the first of the pixel units has first openings therein. The second substrate comprises a common electrode thereon, wherein the common electrode has second openings therein, and the second openings and the first openings are arranged in an overlying and cross-over relationship with respect to each other. The liquid crystal layer is between the first and second substrates.

Another embodiment of a device comprises a pixel unit operative either to transmit or inhibit transmission of light responsive to a control signal. The pixel unit comprises liquid crystal material located between a first substrate and a second substrate. The first substrate has a first slot and a second slot formed therein, the first slot being angularly offset with respect to the second slot. The second substrate has a third slot and a fourth slot formed therein. The first slot and the third slot are arranged in an overlying and cross-over relationship with respect to each other, and the second slot and the fourth slot are arranged in an overlying and cross-over relationship with respect to each other.

It is to be understood that both the foregoing general description and the following detailed description are exemplary and explanatory only and are not restrictive of the invention, as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A is a schematic top view showing one pixel electrode unit on a first substrate according to an embodiment of the present invention.

FIG. 2B is a schematic top view showing one common electrode unit on a second substrate according to an embodiment of the present invention.

DETAILED DESCRIPTION

Figure 1B:
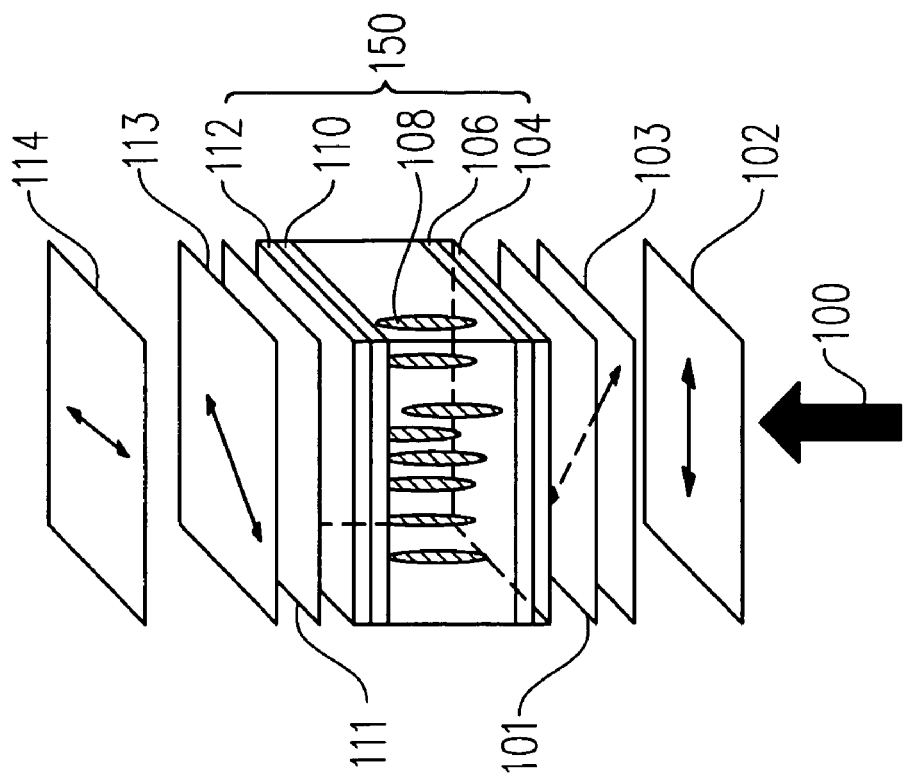
FIG. 1B is a schematic drawing showing another VA mode LCD device according to an embodiment of the present invention.

Reference will now be made in detail to several exemplary embodiments of the invention. Wherever possible, the same reference numbers are used in the drawings and the description to refer to the same or like parts.

Figure 1A:
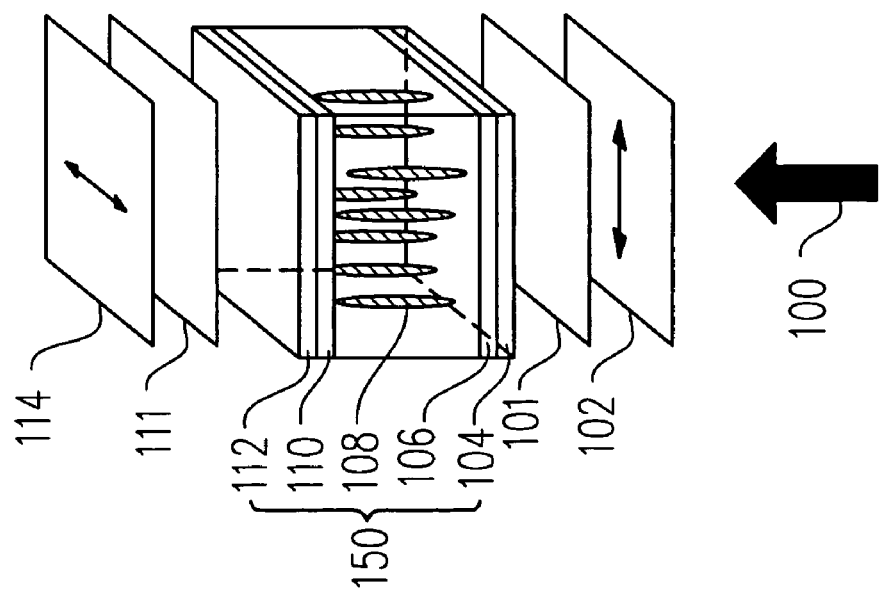
FIG. 1A is a schematic drawing showing a VA mode LCD device according to an embodiment of the present invention.

FIG. 1A is a schematic drawing showing a vertical alignment mode liquid crystal display (LCD) device according to an embodiment of the present invention. As shown in FIG. 1A, the vertical alignment LCD device comprises an LCD panel 150, a first polarizer 102, a second polarizer 114 and a backlight module 100. The included angle between the principle axes of the two polarizers 102, 114 is set at 90°. The liquid crystal display panel 150 includes a first substrate 104 having a pixel layer 106 thereon, a second substrate 112 having a common electrode 110 thereon and a liquid crystal layer 108. In this embodiment, the LCD panel 150 is rubbing-free and formed with relatively simple preparation processes. The liquid crystal layer 108 comprises negative dielectric (Δε<0) liquid crystal materials, for example. Additionally, the liquid crystal layer 108 comprises nematic liquid crystal materials either with chiral dopants or without chiral dopants, for example.

FIG. 1B shows another vertical alignment mode LCD device according to another embodiment of the present invention. The display device of FIG. 1B uses circular polarizers. In other words, two broadband quarter-wave films 103, 113 are placed before and after the crossed linear polarizers 102, 114. The included angle of the principal axis of first linear polarizer 102 and the first broadband quarter-wave film 103 is arranged at 45° to form the front circular polarizer with left-hand circularity, for example. Similarly, the included angle of the principal axis of second linear polarizer 114 and the second broadband quarter-wave film 113 is arranged at 45° to form the rear circular polarizer with right-hand circularity for example.

In addition, in FIG. 1A and FIG. 1B, the liquid crystal molecules of the liquid crystal layer 108 are homeotropically aligned without a rubbing process and the LC cell is in the VA mode at a null voltage state. In the embodiments of FIG. 1A and FIG. 1B, other optical films 101, 111 between the polarizers 102, 114 and the LCD panels 150 are provided. The optical films 101, 111 are compensation films, for example. Such a compensation film can be the combination of negative birefringence and uni-axial birefringence compensation films. Such a compensation film can also be biaxial compensation film or an A-plate or C-plate compensation film. In other embodiments, layers 101 and 111 can be omitted.

The embodiments of FIG. 1A and FIG. 1B further comprise two aligning layers (not shown), such as polymer layers or inorganic layers, wherein one of the aligning layers is disposed between the liquid crystal layer 108 and the pixel layer 106 on the first substrate 104, while the other aligning layer is disposed between the liquid crystal layer 108 and the common electrode 110 on the second substrates 112.

Figure 2C:
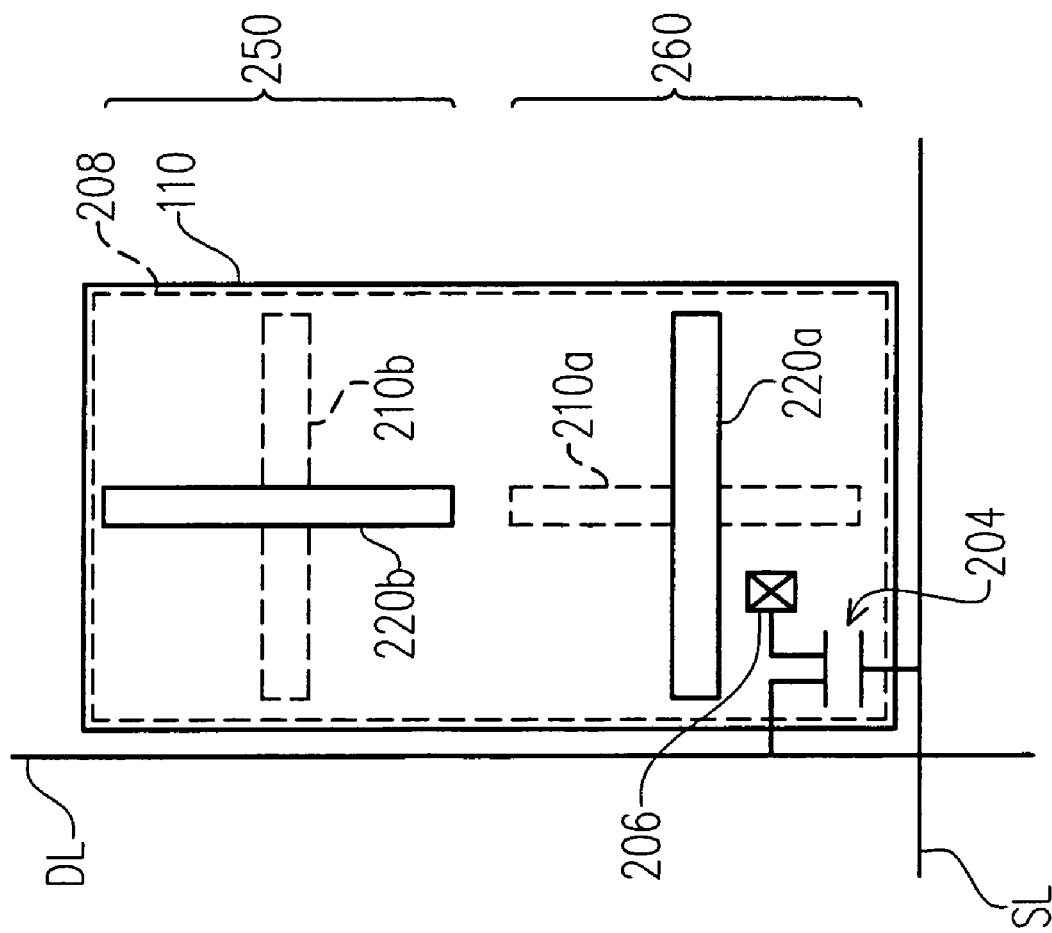
FIG. 2C is a schematic top view showing one pixel unit of a VA mode LCD device according to an embodiment of the present invention.

In the LCD devices of FIG. 1A and FIG. 1B, a plurality of pixel units are repeatedly arranged in the LCD panel 150. FIG. 2A shows one of the pixel electrode units 202 on the first substrate 104, FIG. 2B shows one of the common electrode units 212 opposite to the pixel electrode unit 202 on the second substrate 112, and FIG. 2C shows one of the pixel units of the liquid crystal display panel 150.

With reference to FIG. 2A, one of the pixel electrode units 202 in the pixel layer 106 (FIG. 1A and 1B) comprises a scan line SL, a data line DL, a thin film transistor 204 and a pixel electrode 208. The scan line SL is electrically connected to a first terminal of the thin film transistor 204, the data line DL is electrically connected to a second terminal of the thin film transistor 204, and the pixel electrode 208 is electrically connected to a third terminal of the thin film transistor 204 through the contact 206, for example. In particular, the pixel electrode 208 has two separate stripe-shaped openings 210a, 210b therein. In addition, as shown in FIG. 2B, one of the common electrode units 212 on the second substrate 112 (FIG. 1A or FIG. 1B) comprises a common electrode 110, wherein the common electrode 110 also has two separate stripe-shaped openings 220a, 220b therein. In some embodiments, a color filter layer (not shown) may be formed between the second substrate 112 and the common electrode 110.

As shown in FIGS. 2A, 2B and 2C, the stripe-shaped openings 210a, 210b and the stripe-shaped openings 220a, 220b are arranged in an overlying and cross-over relationship with respect to each other. That is, there is a horizontal opening 210b on the first substrate 104 corresponding to the vertical opening 220b on the second substrate 112, and a vertical opening 210a on the first substrate 104 corresponding to the horizontal opening 220a on the second substrate 112. The openings 210a, 210b, 220a, 220b can be formed by photolithography and etching processes, for example.

As an example of a display device (FIG. 1A) using linear polarizers, when there is no voltage applied, the incident light is completely blocked by the crossed polarizers 102, 114 and an excellent dark state is obtained. When the voltage is applied, fringe electric fields surrounding the pixel electrodes, the common electrode surfaces and the openings 210a, 210b, 220a, 220b on the two substrates 104, 112 are created. The negative dielectric liquid crystal molecules inbetween the substrates 104, 112 are reoriented perpendicular to the electric field direction. Therefore, light transmits through the crossed linear polarizers 102, 114. Due to the fringe field effect from the substrates 104, 112 and the stripe-shaped openings 210a, 210b, 220a, 220b, the liquid crystal molecules tilt different directions and multi-domains are formed in the pixel unit. In the topological configuration of FIG. 2C, the openings 210a, 210b, 220a, 220b help to form two four-domain structures on the two separate sub-pixel areas 250, 260 in one pixel unit. In addition, a contrast ratio >1000:1 can be achieved relatively easily. The similar working mechanism is applicable to the display device (FIG. 1B) using the circular polarizers.

Figure 3B:
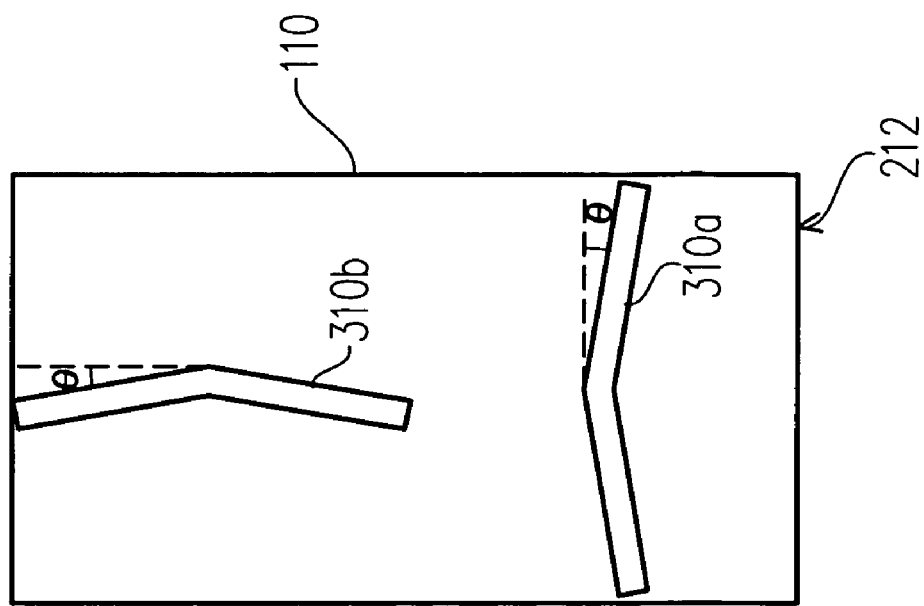
FIG. 3B is a schematic top view showing one common electrode unit on a second substrate according to another embodiment of the present invention.
Figure 3A:
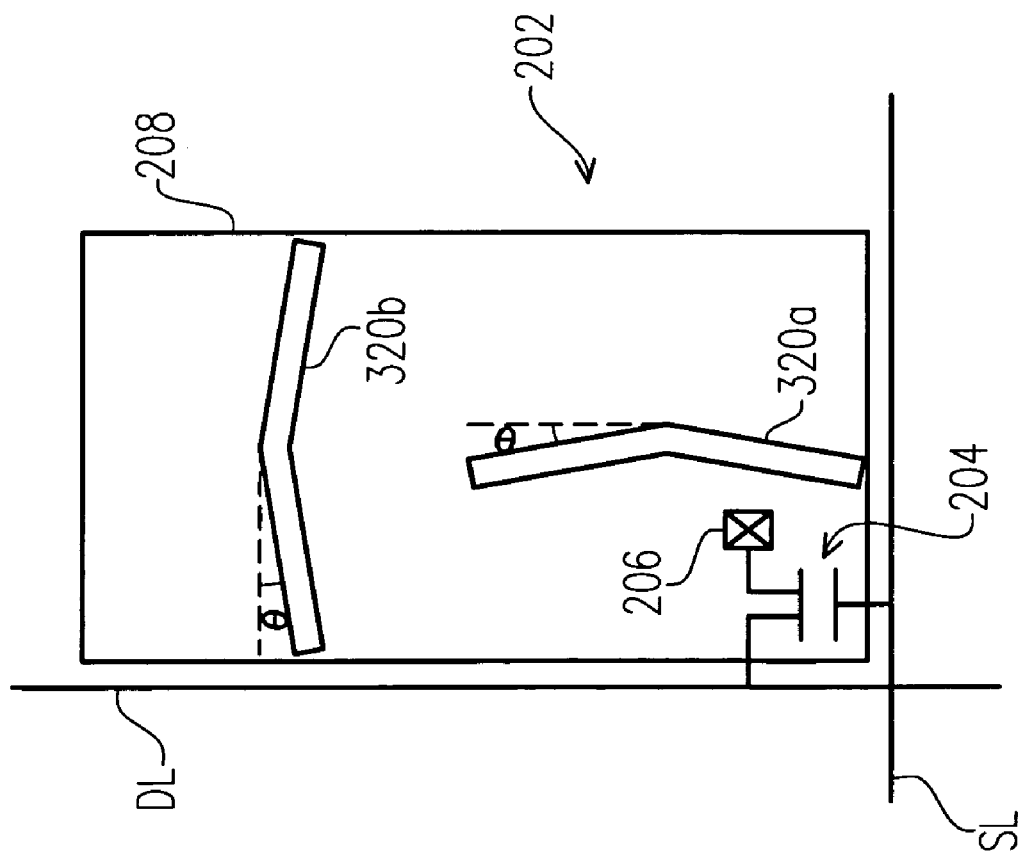
FIG. 3A is a schematic top view showing one pixel electrode unit on a first substrate according to another embodiment of the present invention.
Figure 3C:
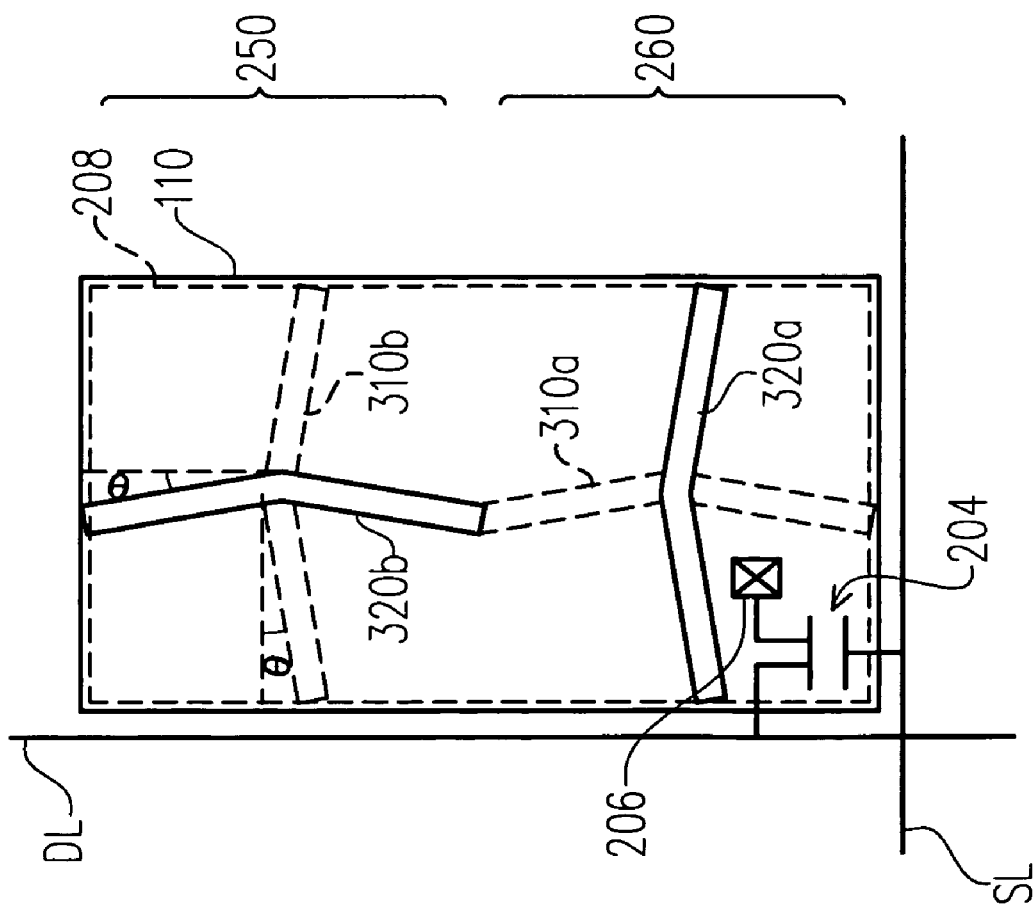
FIG. 3C is a schematic top view showing one pixel unit of a VA mode LCD device according to another embodiment of the present invention.

According to another embodiment, the openings formed in the pixel electrodes and the common electrode may also be bent slot-shaped openings. As shown in FIGS. 3A, 3B and 3C, the bent slot-shaped openings 310a, 310b, 320a, 320b have a tilt angle θ between 0 and 90 degrees. The similar working mechanism as above mentioned is applicable to the display device using the bent slot-shaped openings.

For explanation and demonstration purposes, we describe the following examples as indicated in FIG. 2C and FIG. 3C using negative dielectric liquid crystal materials with linear polarizers and circular polarizers, respectively.

EXAMPLE 1

The display device of FIG. 1A having linear polarizers and stripe-shaped openings (as shown in FIG. 2C) will now be described. Both the pixel electrode and common electrode in the pixel electrode unit and the common electrode unit have two separate stripe-shaped openings therein. The repeated pixel unit size is 43 μm×86 μm. The stripe-shaped openings can be formed by etching or photo-lithography during a TFT fabricating process. In this case, the widths and the lengths of the stripe-shaped openings are 3 μm and 43 μm, respectively. The cell gap between the two substrates is 4 μm. A negative liquid crystal mixture MLC-6608 (Merck Company: birefringence Δn=0.083, dielectric anisotropy Δε=−4.2 and rotational viscosity $\gamma_1$=0.186 Pa·s) which is aligned vertical to the substrates in the initial state is used. The azimuthal angle is 0° and the pretilt angle is 90°.

Figure 4:
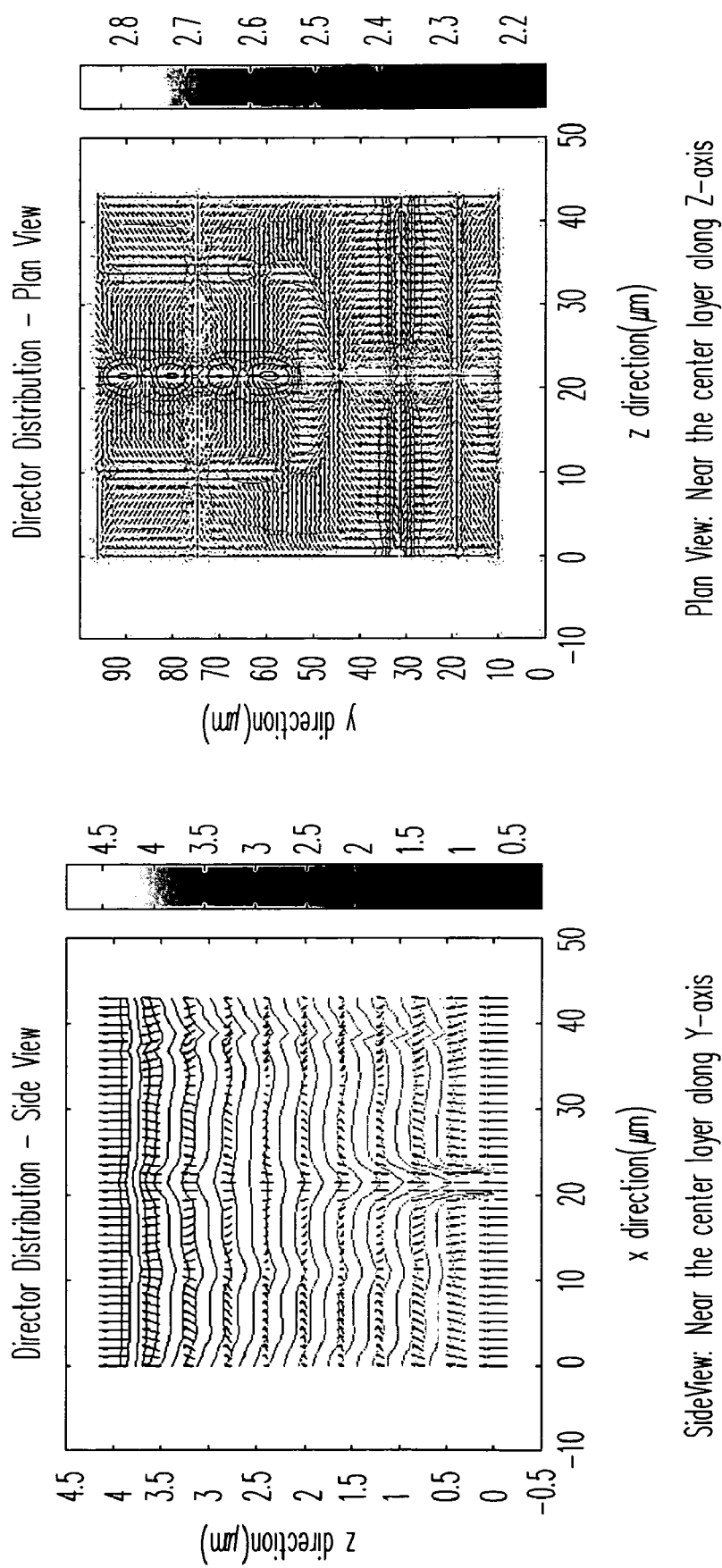
FIG. 4 shows a simulated LC director distribution of one pixel unit of the embodiment of the VA mode LCD device of FIG. 1A with the stripe-shaped openings.

FIG. 4 is the simulated liquid crystal director distribution of Example 1 when the applied voltage is 5 $V_{rms}$ between the common electrode and pixel electrode. The distribution is cut from the middle layer of the liquid crystal cell gap and nearby the center of the pixel unit along the Y-axis direction. From the side view, it can be observed that the liquid crystal directors are reoriented along the electric field direction due to the fringing field effect. On the plan view, it can be seen that the liquid crystal directors have been divided into four evident domains in every sub-pixel area. Therefore, a multi-domain LCD device has been formed from the stripe-shaped opening in the sub-pixel area under the application of an electric field.

Figure 5:
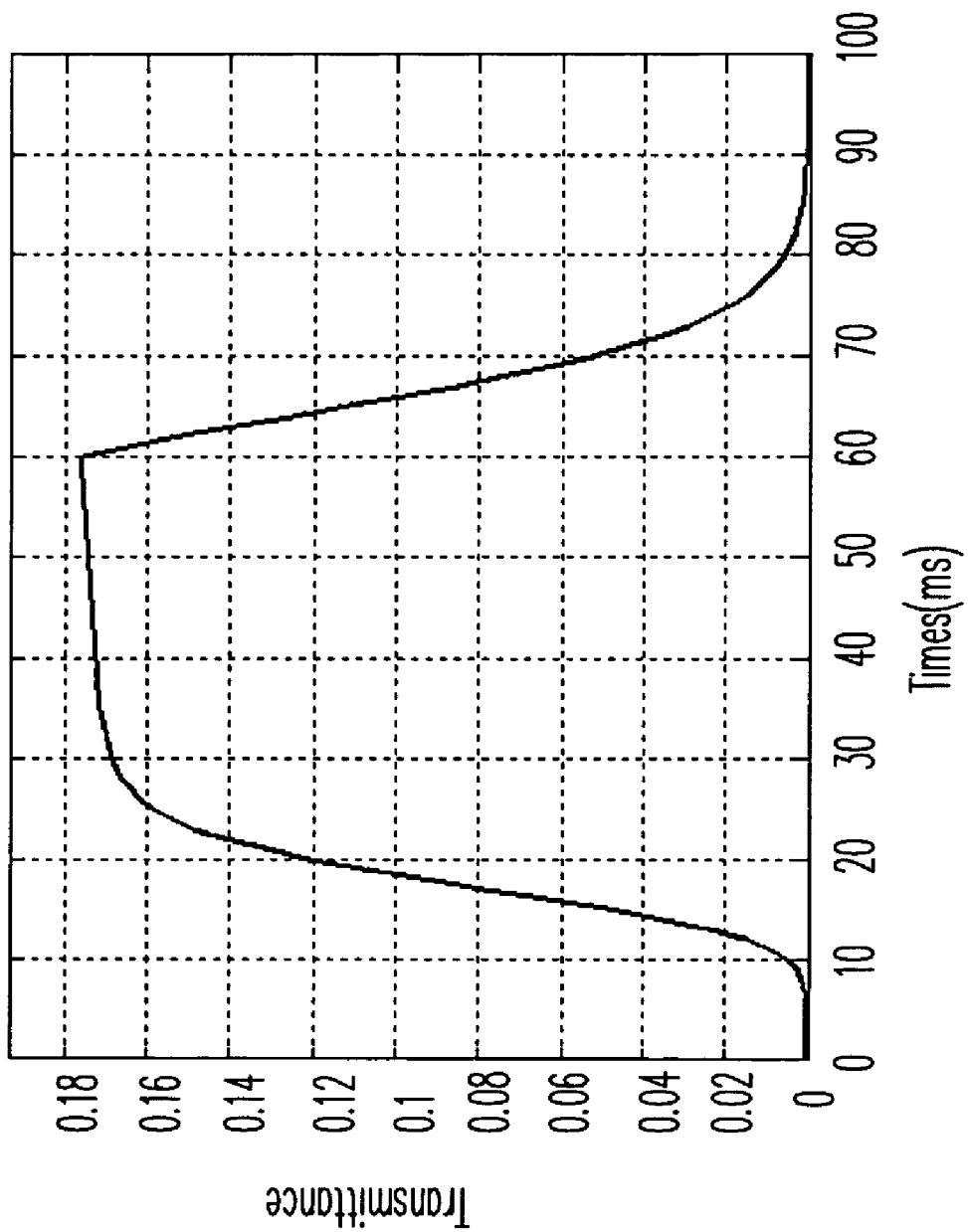
FIG. 5 shows the time-dependent transmittance of one pixel unit of the VA mode LCD device of FIG. 1A under the linear polarizers.
Figure 6:
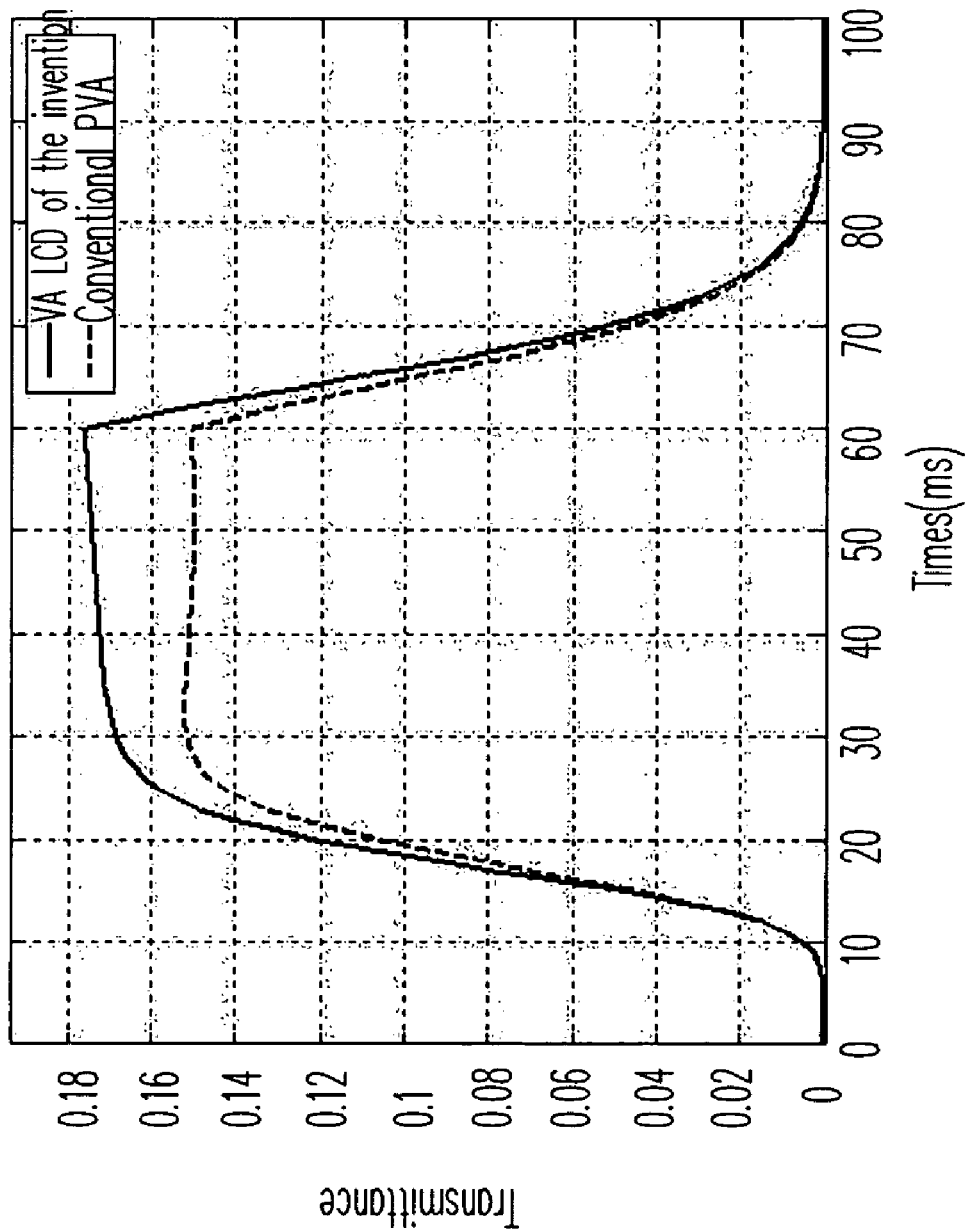
FIG. 6 shows the time-dependent transmittance comparison of conventional PVA mode with the VA mode LCD device FIG. 1A under the linear polarizers.

FIG. 5 is the time-dependent transmittance of the VA mode LCD device of Example 1 under the linear polarizers using Merck LC material MLC-6608 at the wavelength λ=550 nm when a pulsed voltage of 5 Vrms is applied. Typically, after taking into account the optical losses of polarizers, the transmittance is 17.5%. For the purpose of comparison, a conventional PVA mode LCD device under the same cell conditions is used as a benchmark. In this regard, FIG. 6 shows the time-dependent transmittance of the VA mode LCD device compared with that of the conventional PVA mode LCD device, which has only one horizontal or vertical opening on the respective top and bottom electrodes. The negative LC mixture MLC-6608 was used at λ=550 nm under the linear polarizers. The applied voltage is V=5 $V_{rms}$ and the opening width is 3 μm. It can be seen that the conventional PVA mode has the lower transmittance of 15% at the rise time stage of 60 ms. Therefore, the VA mode LCD device has a light intensity improvement of 16.7% over that of the conventional PVA mode LCD device.

Figure 7:
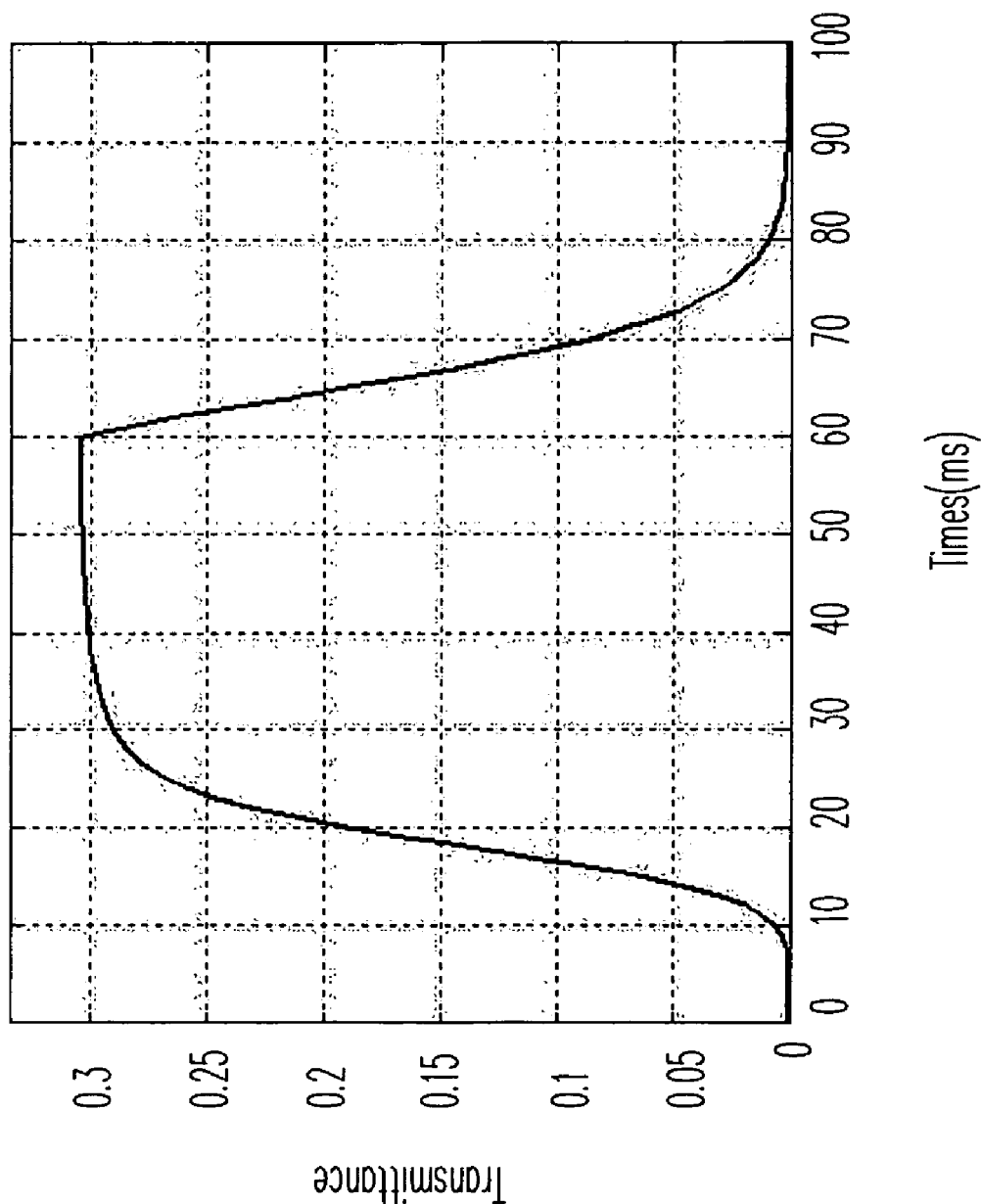
FIG. 7 shows the time-dependent transmittance of one pixel unit of the VA mode LCD device of FIG. 1A under the circular polarizers.

To further improve the light transmittance of a VA mode LCD, circular polarizers are used in the embodiment of FIG. 7. As shown in FIG. 7, the transmittance has been greatly improved as compared to an embodiment using linear polarizers. The transmittance is 17.5% for the linear polarizers while it is increased to 31.25% using circular polarizers. Thus, there is a 78.6% improvement in the light transmittance. For the two polarizers alone, the maximum transmittance is 35%. Thus, the multi-domain VA LCD exhibits 89.3% (at 5 $V_{rms}$) normalized transmittance as compared to that of a 90° TN LCD.

Figure 8:
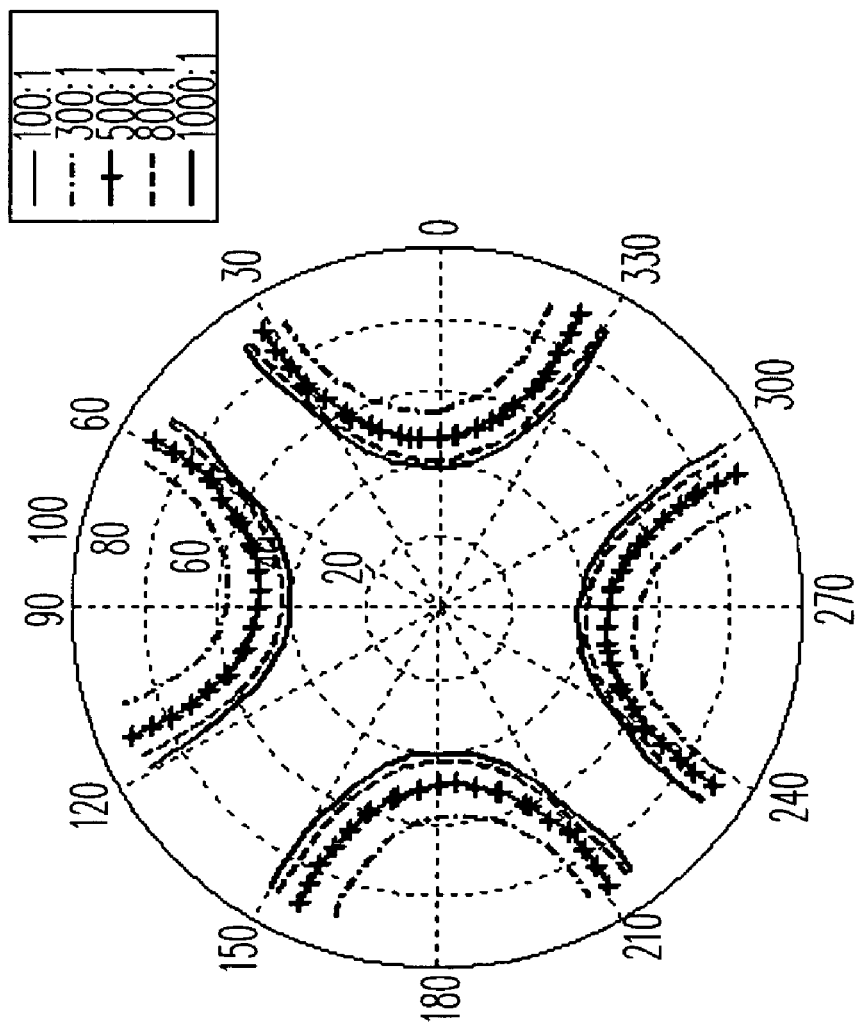
FIG. 8 shows the iso-contrast contours of the VA mode LCD device of FIG. 1A between 0 $V_{rms}$ and 5 $V_{rms}$ using the stripe-shaped openings, wherein a set of a-plate and c-plate compensation films are added.

A pair of negative C-plate and positive A-plate compensation films also can be implemented in some embodiments to show the view angle ability of such a VA mode LCD device having stripe-shaped openings and linear polarizers. A set of A-plate and C-plate compensation films are added at the dΔn value of 98 nm and 12.3 nm, and 112.4 nm and 134.7 nm, before and after the linear polarizer. The contrast ratio is calculated between 0 $V_{rms}$ and 5 $V_{rms}$. As shown in FIG. 8, this embodiment of a VA mode LCD device has a high contrast ratio nearby the center area that is better than 1000:1. The iso-contrast contour of 1000:1 is at about ±40° and symmetric with respect to the x and y directions. The iso-contrast contour of 100:1 on both the right-left region and the up-down region is approximately ±85°, which demonstrates that the device has a wide view angle of above 160°. Therefore, embodiments of the VA mode LCD device of the present invention can emit a high contrast ratio of 1000:1 and exhibit a very wide view angle capability.

EXAMPLE 2

An embodiment of a display device using linear polarizers or circular polarizers (FIG. 1A or FIG. 1B) and having bent slot-shaped openings with the tilt angle θ of 10° (FIG. 3C) will now be described. The bent slot-shaped openings are arranged such that each pixel unit includes two corresponding pairs of openings as shown in FIG. 3C. The repeated pixel unit size is 43 μm×86 μm. The bent slot-shaped openings can be formed by etching or photo-lithography during a TFT preparation process. The widths and the lengths of the bent slot-shaped openings are at 3 μm and 43 μm, respectively. The cell gap between the two substrates is 4 μm. A negative LC mixture MLC-6608 (Merck Company: birefringence Δn=0.083, dielectric anisotropy Δε=−4.2 and rotational viscosity $\gamma_1$=0.186Pa·s) aligned vertical to the substrates in the initial state is used. The azimuthal angle is 0° and the pretilt angle is 90°.

Figure 9:
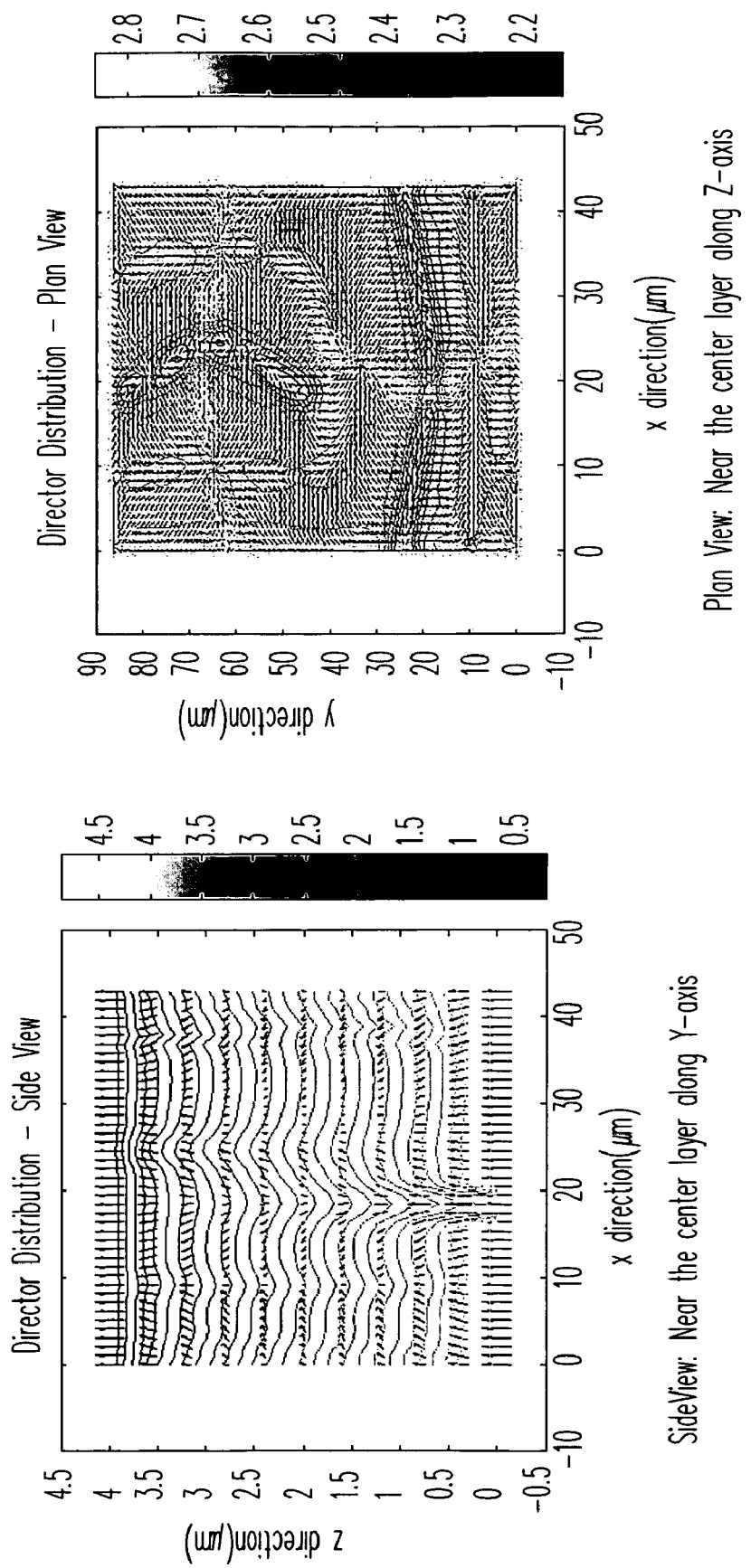
FIG. 9 shows the simulated LC director distribution of the one pixel unit of the VA mode LCD device of FIG. 1A with the bending-shaped openings having a tilt angle θ of 10°.

FIG. 9 is the simulated LC director distribution of Example 2 when the applied voltage is 5 $V_{rms}$ between the common electrode and pixel electrode. The distribution is cut from the middle layer of the LC cell gap and nearby the center of the pixel unit along the Y-axis direction. From the side view, it can be observed that the LC directors are reoriented along the electric field direction due to the fringing field effect. On the plan view, it can be seen that the LC directors have been divided into several evident domains in every sub-pixel area. Therefore, a multi-domain LCD device has been formed from the bent slot-shaped openings in the sub-pixel area under the application of electric field.

Figure 10:
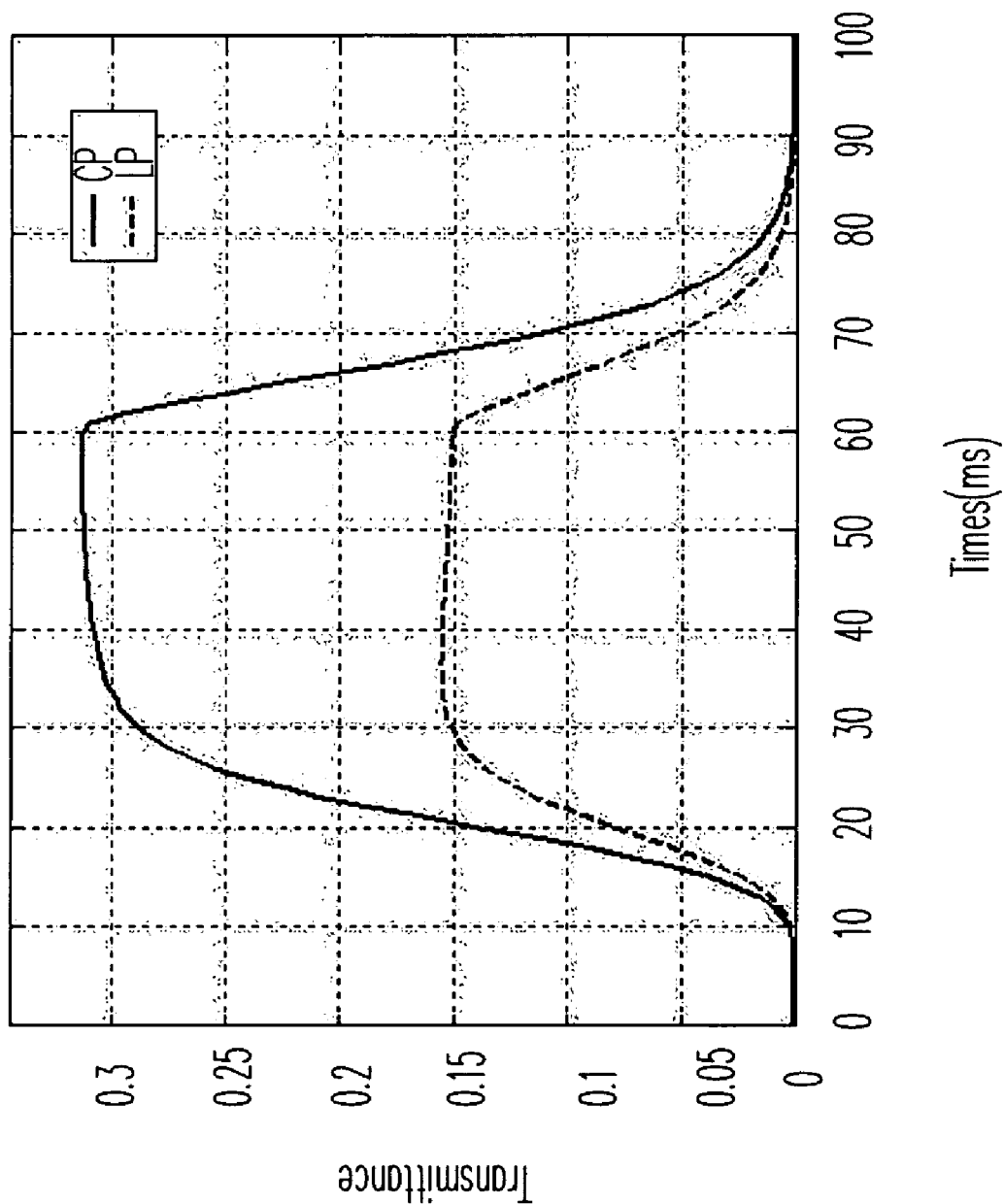
FIG. 10 shows the time-dependent transmittance of one pixel unit of the VA mode LCD device of FIG. 1A with bending-shaped openings having a tilt angle θ of 10° under the linear and circular polarizers.

FIG. 10 is the time-dependent transmittance of the VA mode LCD device of Example 2 using linear polarizers (LP) and circular polarizers (CP), respectively. The used liquid crystal material is Merck MLC-6608 at the wavelength λ=550 nm and the applied voltage is a pulsed one at 5 Vrms. The transmittance of the VA mode LCD device is 15.1% with the linear polarizers, which is nearly the same as that of the conventional PVA modes as discussed in Example 1. In contrast, the transmittance of the VA mode LCD device with the circular polarizers has been greatly improved as compared to that of the linear polarizers indicated from FIG. 10. The transmittance has increased to 31% with the circular polarizers, which is a 105.3% improvement over that of the linear polarizers. Accordingly, an 88.6% normalized transmittance is exhibited as compared to that of a 90° TN LCD when the applied voltage is 5 $V_{rms}$.

Figure 11:
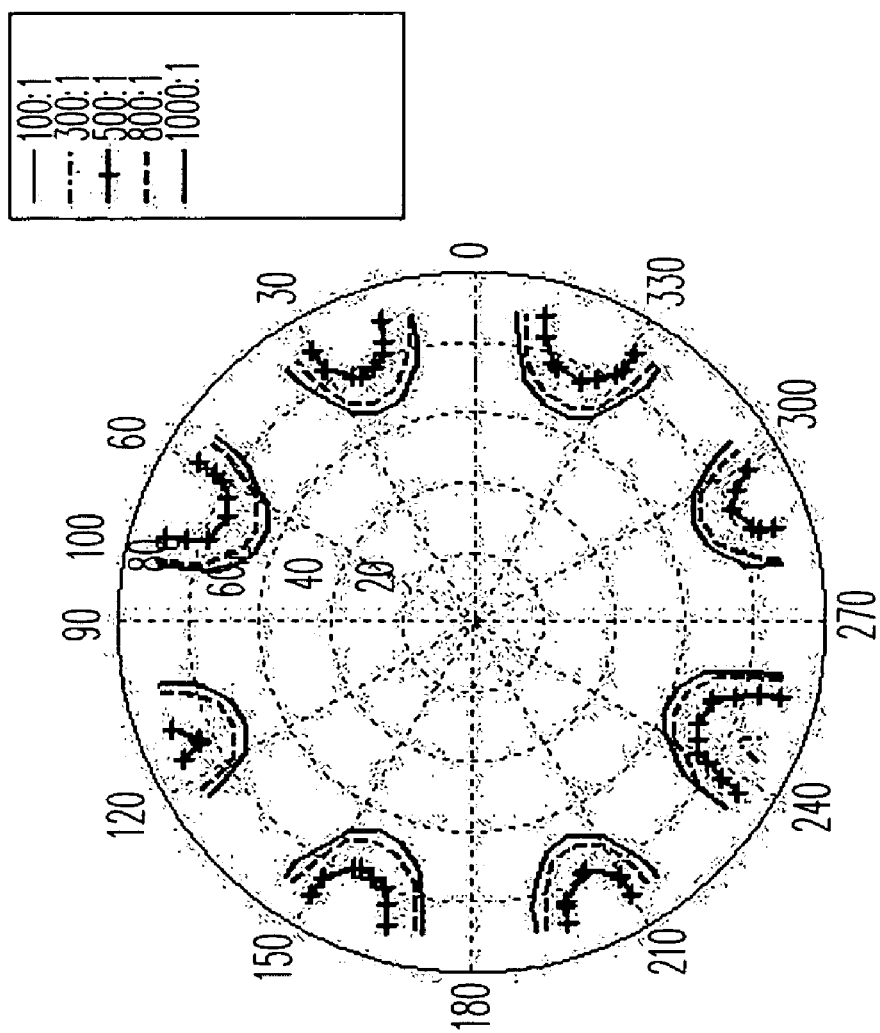
FIG. 11 shows the iso-contrast contours of an embodiment of a VA mode LCD device between 0 $V_{rms}$ and 5 $V_{rms}$ using the bending-shaped openings, wherein an a-plate compensation film and a pair of A-plate and C-plate compensation films are added.

In some embodiments, an A-plate compensation film is added at the dΔn value of 64.6 nm before the linear polarizer, and a pair of A-plate and C-plate compensation films are added at the dΔn value of 119 nm and 168.3 nm after the linear polarizer. The contrast ratio is calculated between 0 $V_{rms}$ and 5 $V_{rms}$. As shown in FIG. 11, such a device has a high contrast ratio of 1000:1 in the range of ±70°. The iso-contrast contour of 300:1 on both the right-left region and the up-down region is approximately ±80°, which demonstrates that the device has a wide view angle of above 160° even with an excellent contrast ratio of 300:1. Therefore, such a VA mode LCD device can exhibit a high contrast ratio of 1000:1 and very wide view angle ability—better than 300:1 over the entire view range.

EXAMPLE 3

Embodiments of a display device using linear polarizers or circular polarizers (FIG. 1A or FIG. 1B) and having bent slot-shaped openings with a tilt angle θ of 25° (FIG. 3C) will now be described. The bent slot-shaped openings are arranged as previously described. The repeated pixel unit size is 43 μm×86 μm. The bent slot-shaped openings can be formed by etching or photo-lithography during a TFT preparation process. The widths and the lengths of the bent slot-shaped openings are at 3 μm and 43 μm, respectively. The cell gap between the two substrates is 4 μm. A negative LC mixture MLC-6608 (Merck Company: birefringence Δn=0.083, dielectric anisotropy Δε=−4.2 and rotational viscosity $γ_1$=0.186 Pa·s) aligned vertical to the substrates in the initial state is used. The azimuthal angle is 0°, and the pretilt angle is 90°.

Figure 12:
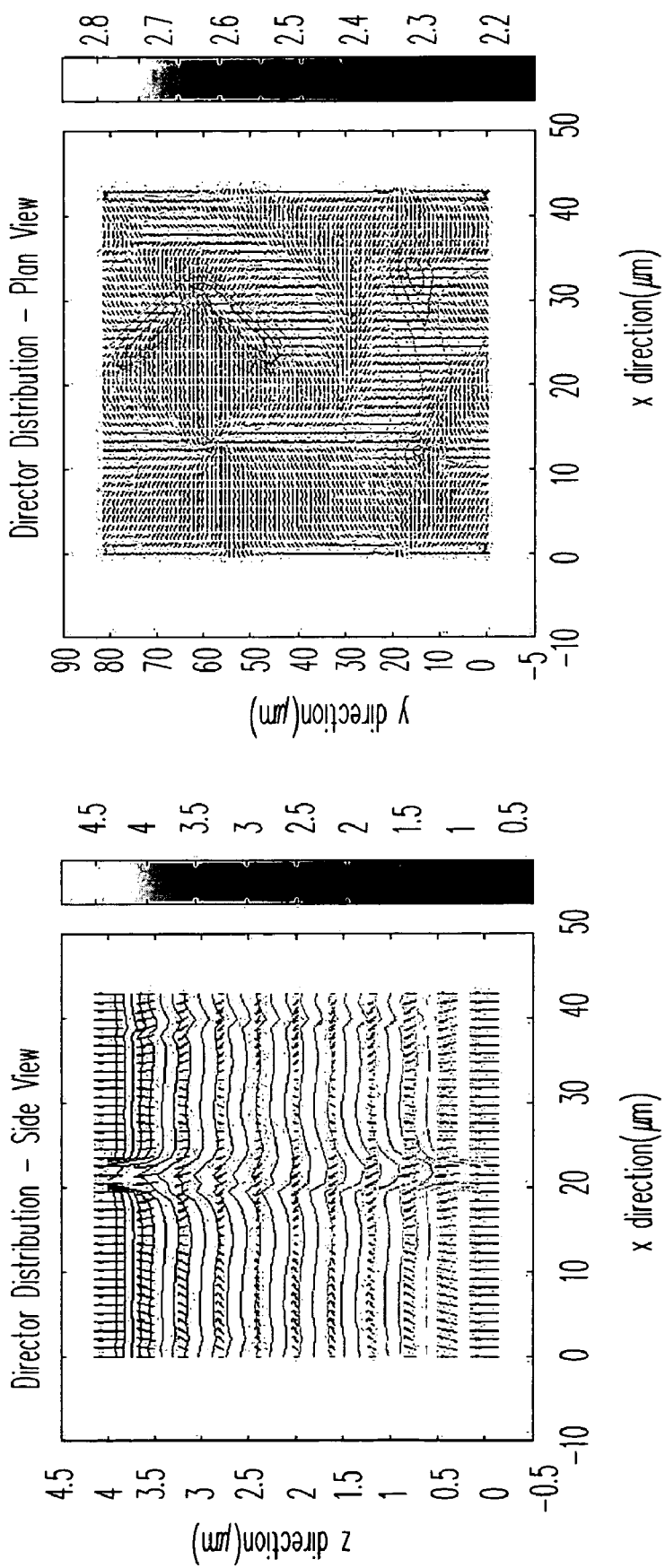
FIG. 12 shows the simulated LC director distribution of one pixel unit of the VA mode LCD device of FIG. 11 with the bending-shaped openings having a tilt angle θ of 25°.

FIG. 12 is the simulated LC director distribution of Example 3 when the applied voltage is 5 $V_{rms}$ between the common electrode and pixel electrode. The distribution is cut from the middle layer of the LC cell gap and nearby the center of the pixel unit along the Y-axis direction. From the side view, it can be observed that the LC directors are reoriented along the electric field direction due to the fringing field effect. On the plan view, it can be seen that the LC directors have been divided into several evident domains in every sub-pixel area. Therefore, a multi-domain LCD device has been formed from the bent slot-shaped opening in the sub-pixel area under the application of an electric field.

Figure 13:
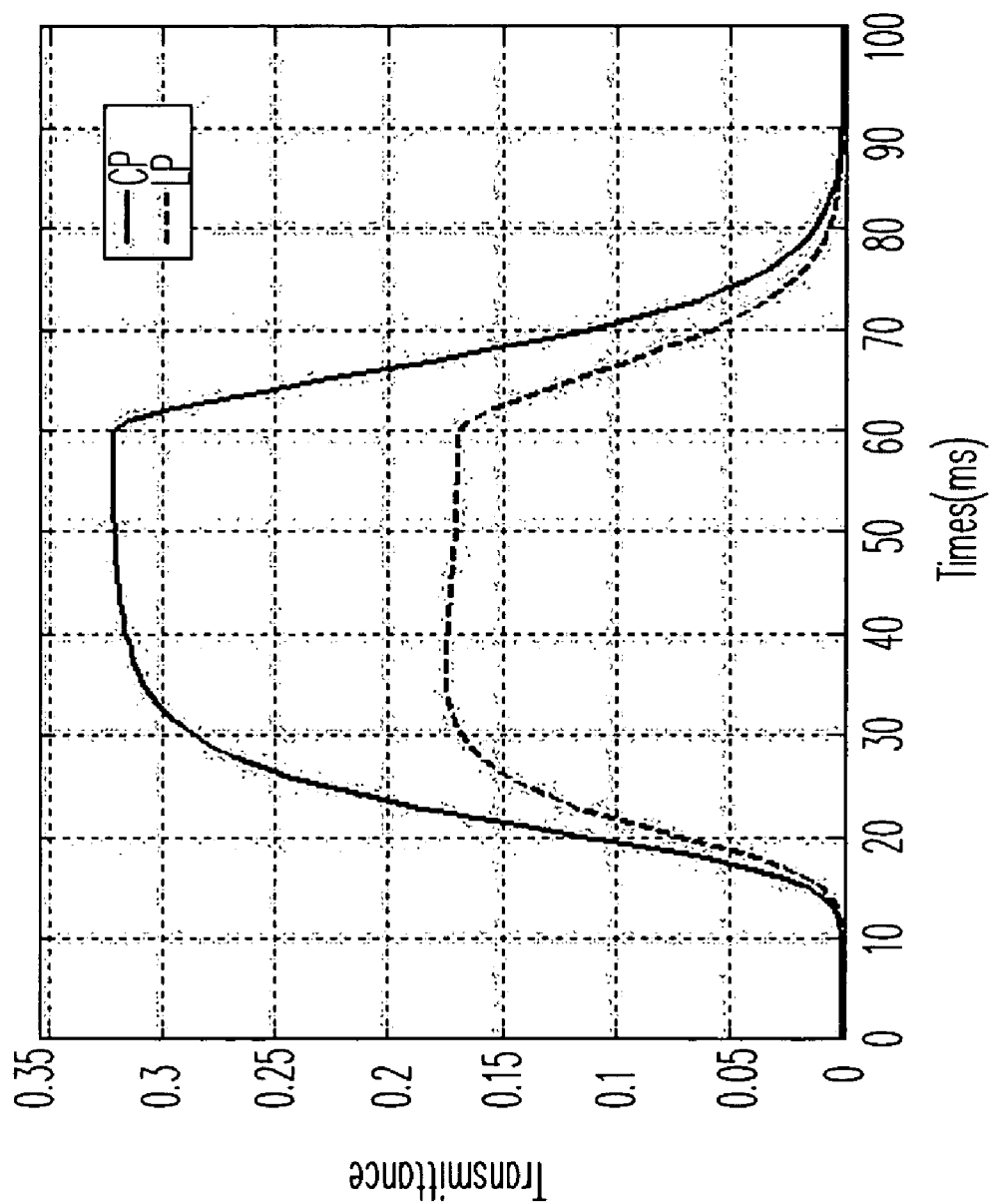
FIG. 13 shows the time-dependent transmittance of one pixel unit of the VA mode LCD device of FIG. 11 with bending-shaped openings having a tilt angle θ of 25° under the linear polarizers (LP) and the circular polarizers (CP).

FIG. 13 is the time-dependent transmittance of the VA mode LCD device of Example 3 using linear polarizers (LP) and circular polarizers (CP), respectively. The used LC material is Merck MLC-6608 at the wavelength λ=550 nm and the applied voltage is a pulsed one at 5 Vrms. The transmittance of the VA mode LCD device is 17% with the linear polarizers, which is higher than that of the conventional PVA modes as discussed in Example 1. When the circular polarizers are used, the transmittance has increased to 32.2%, which is 89.4% improvement over that of the linear polarizers. Therefore, the light transmittance of the VA mode LCD device can be greatly improved when the circular polarizers are used.

Figure 14:
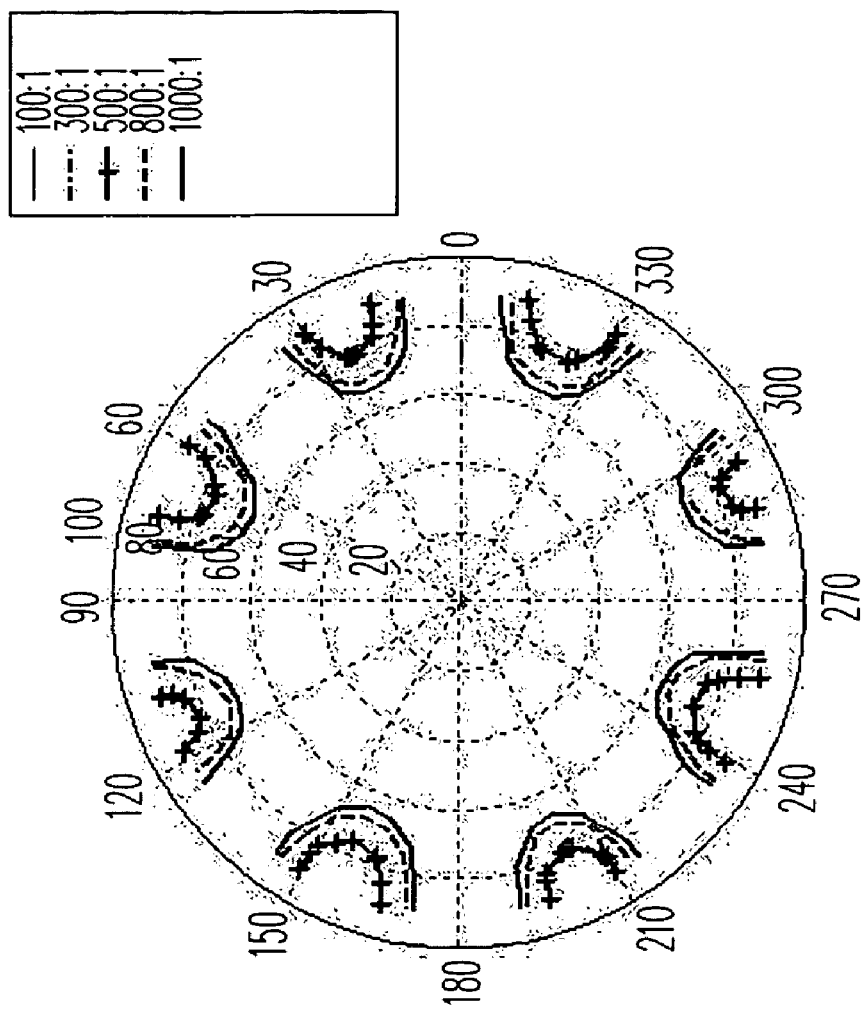
FIG. 14 shows the iso-contrast contours of an embodiment of a VA mode LCD device between 0 $V_{rms}$ and 5 $V_{rms}$ using the bending-shaped openings, wherein an a-plate compensation film and a pair of A-plate and C-plate compensation films are added.

In some embodiments, an A-plate compensation film is added at the dΔn value of 64.3 nm before the linear polarizer, and a pair of A-plate and C-plate compensation films are added at the dΔn value of 119.3 nmnm and 168.1 nm after the linear polarizer. The contrast ratio is calculated between 0 $V_{rms}$ and 5 $V_{rms}$. As shown in FIG. 14, the device has a high contrast ratio of 1000:1 in the range of ±70°. The iso-contrast contour of 300:1 on both the right-left region and the up-down region is approximately ±80°, which demonstrates that the device has a wide view angle of above 160° even with an excellent contrast ratio of 300:1. Therefore, in addition to its high transmittance, the advantages of the super-wide view angle and high contrast ratio potentially make such a VA mode LCD device particularly beneficial for LC TV and monitor applications.

Figure 15:
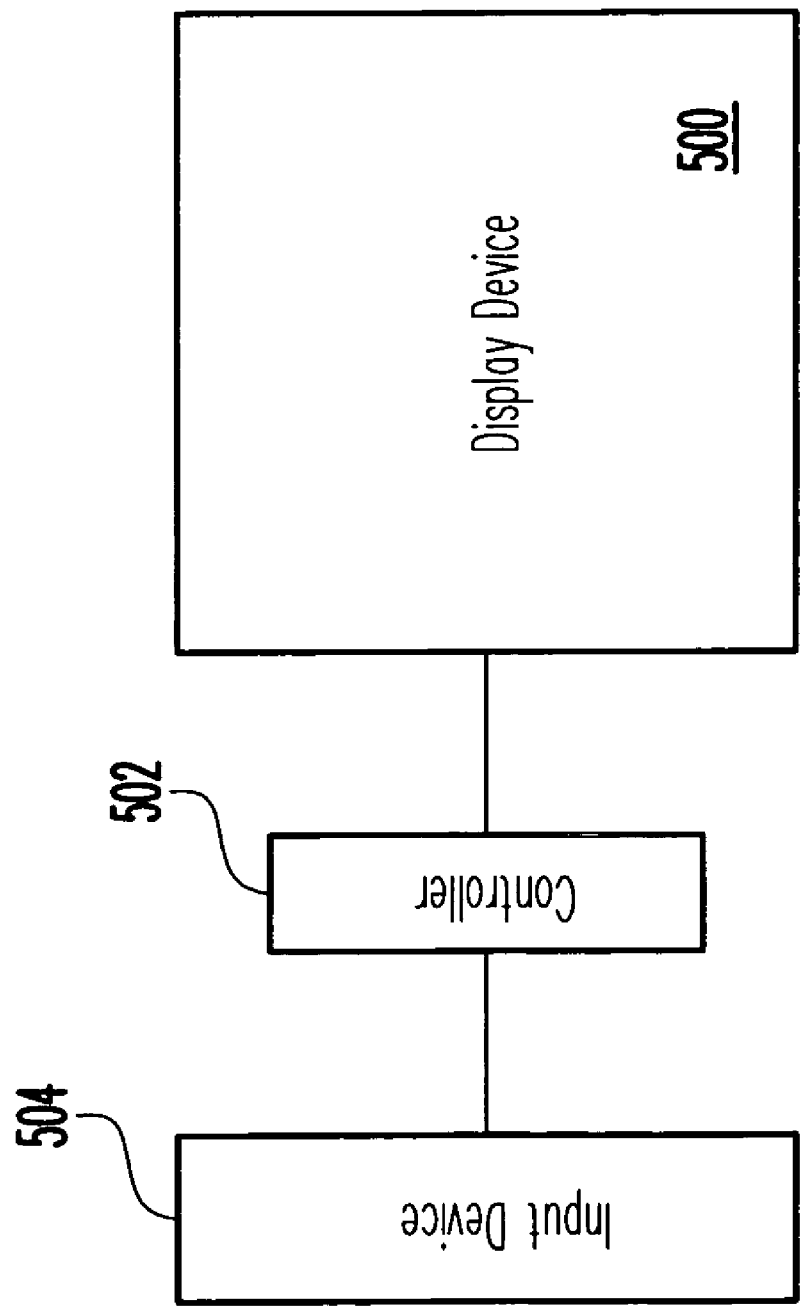
FIG. 15 is a schematic top view showing an electronic device according to an embodiment of the present invention.

An embodiment of an electronic device using an embodiment of a VA mode LCD device depicted in FIG. 15. As shown in FIG. 15, the electronic device may comprise a display device 500, a controller 502 and an input device 504. The display device 500 may be similar to the vertical alignment liquid crystal display of FIG. 1A or FIG. 1B having stripe-shape openings or bent slot-shape openings. The controller 502 may be electrically coupled to the display device 500. The controller 502 may comprise source and gate driving circuits (not shown) to control the display device 500 to render image in accordance with an input. The input device 504 may be electrically coupled to the controller 502 and may include a processor or the like to input data to the controller 502 to render images on the display device 500.

What is claimed is:

1. A device comprising:
   a plurality of pixel units configured for use in a vertical alignment liquid crystal display, wherein a first of the pixel units comprises;
   a first substrate comprising a pixel layer thereon, wherein the pixel layer comprises a thin film transistor and a pixel electrode, and the pixel electrode in the first of the pixel units has first openings therein;
   a second substrate comprising a common electrode thereon, wherein the common electrode has second openings therein, and the second openings and the first openings are arranged in an overlying and cross-over relationship with respect to each other; and
   a liquid crystal layer between the first and second substrates.

2. The device according to claim 1, wherein the first-openings are two stripe-shaped openings, and the second openings are two stripe-shaped openings.

3. The device according to claim 1, wherein the first openings are two -bent slot-shaped openings, and the second openings are two bent slot-shaped openings.

4. The device according to claim 3, wherein the bent slot-shaped openings have tilt angles θ between 0 and 90 degrees.

5. The device according to claim 1, wherein the first of the pixel units is divided into two sub-pixel areas by the first openings and the second openings.

6. The device according to claim 1, wherein the liquid crystal layer comprises liquid crystal materials with negative dielectric anisotropy.

7. The device according to claim 6, wherein the liquid crystal layer comprises nematic liquid crystal materials either with chiral dopants.

8. The device according to claim 1, further comprising two polarizers disposed on exterior surfaces of the first and second substrates, respectively.

9. The device according to claim 8, wherein the polarizers are linear polarizers.

10. The device according to claim 8, wherein the polarizers are circular polarizers, and each of the circular polarizers comprises a linear polarizer and a broadband quarter wave film.

11. The device according to claim 8, further comprising at least one compensation film disposed between one of the polarizers and one of the first and second substrates.

12. The device according to claim 11, wherein the compensation film comprises a combination of negative birefringence and uni-axial birefringence.

13. The device according to claim 11, wherein the compensation film is a biaxial compensation film.

14. The device according to claim 11, wherein the compensation film is an A-plate or C-plate compensation film.

15. The device according to claim 1, further comprising a color filter layer between the second substrate and the common electrode.

16. The device according to claim 1, further comprising two aligning layers between the liquid crystal layer and the first and second substrates.

17. The device according to claim 1, wherein the pixel units form a portion of a display device; and
    further comprising;
    a controller electrically coupled to the display device.

18. The device according to claim 17, further comprising:
    an input device electrically coupled to the controller to render an image on the display device.

19. The device according to claim 17, further comprising:
    means for rendering an image on the display device.

20. A device comprising:
    a pixel unit operative to either transmit light or inhibit transmission of light responsive to a control signal;
    the pixel unit comprising liquid crystal material located between a first substrate and a second substrate;
    the first substrate having a first slot and a second slot formed therein, the first slot being angularly offset with respect to the second slot;
    the second substrate having a third slot and a fourth slot formed therein;
    wherein the first slot and the third slot are arranged in an overlying and cross-over relationship with respect to each other, and the second slot and the fourth slot are arranged in an overlying and cross-over relationship with respect to each other.

* * * * *